(12) United States Patent
Benedetti et al.

(10) Patent No.: US 6,206,327 B1
(45) Date of Patent: Mar. 27, 2001

(54) MODULAR SPACECRAFT BUS

(75) Inventors: Steven L. Benedetti, Redwood City; Timothy S. Cahill, San Jose; Russell Chan, Sunnyvale; Kris D. Forrest, San Martin, all of CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/282,830

(22) Filed: Mar. 31, 1999

(51) Int. Cl.[7] .................................................. B64G 1/00
(52) U.S. Cl. .................................... 244/158 R; 244/163
(58) Field of Search ................................ 246/158 R, 163

(56) References Cited

U.S. PATENT DOCUMENTS

| | | |
|---|---|---|
| 3,709,447 | 1/1973 | Devlin . |
| 4,298,178 * | 11/1981 | Hujsak ............................. 244/158 R |
| 4,682,744 * | 7/1987 | Gounder ........................... 244/158 R |
| 5,314,146 | 5/1994 | Chicoine et al. . |
| 5,518,209 | 5/1996 | Chicoine et al. . |
| 5,522,569 | 6/1996 | Steffy et al. . |
| 5,527,001 | 6/1996 | Stuart . |
| 5,624,088 | 4/1997 | Fiore . |
| 5,628,476 * | 5/1997 | Soranno et al. .................. 244/158 R |
| 5,735,489 | 4/1998 | Drolen et al. . |
| 5,755,406 | 5/1998 | Aston et al. . |
| 5,839,696 | 11/1998 | Caplin et al. . |
| 5,884,866 * | 3/1999 | Steinmeyer et al. ............. 244/158 R |

* cited by examiner

*Primary Examiner*—Galen L. Barefoot
(74) *Attorney, Agent, or Firm*—Thomas C. Feix; Donald C. Feix (57) ABSTRACT

A mission configurable modular satellite bus structure composed of several scalable modules, including a propulsion module and one or more stackable space modules, each using standard subsystems or components with common structures and/or interfaces, that can be processed in parallel to minimize nonrecurring and recurring costs. Each stackable space module includes a generally cylindrical central hub having a plurality of radial rib panels extending outwardly therefrom to form a plurality of bays for containing subsystem equipment. The hub includes a hollow center sized to receive the propulsion module as a fully assembled unit. The radial rib panels carry the primary structural load of the spacecraft. Also provided are removable side access panels that form enclosures for the bays. The side access panels include equipment mounts along an inside surface for mounting the subsystem components and radiators along an outside surface to provide thermal cooling for the mounted subsystem equipment. The modular bus structure of the present invention is lightweight, stiff, strong, dimensionally stable and is therefore most suitable for highly agile, remote sensing commercial, civil space and government missions. The high degree of access to the spacecraft interior afforded by the present invention allows the various subsystems to be installed as separate, line tested assemblies.

15 Claims, 8 Drawing Sheets

MODULAR SPACECRAFT BUS

BACKGROUND OF THE INVENTION

The present invention relates to space satellite systems architecture, and more particularly, to a multi-mission adaptable modular spacecraft bus having improved structural, thermal, and accessibility characteristics and reduced part count.

In the past, almost every new space program would develop a spacecraft bus design optimized for a specific space mission. Previous common bus designs failed to allow for ease in tailoring the bus to accommodate mission differences. This design approach has lead to a proliferation of mission specific bus designs.

For cost and performance effectiveness in today's competitive environment, satellite buses must be (1) scalable for various missions, (2) adaptable to fit a variety of launch vehicles, and (3) provide economies of scale in development and production cycles through the use of commercial subsystems and components and manufacturing and testing processes.

Current state of the art spacecraft fabrication and assembly techniques use a high degree of composites. Composites offer many advantages over the metallic materials commonly used in the primary supporting structure of conventional spacecraft designs. A key benefit of composites is that they can provide significant weight reductions in the final product. Composites are more easily fashioned into structural pieces of complex geometry (e.g. rounded surfaces. irregular profiles, etc.), and thus extensive use of composites can help to reduce part count as well as reduce the number of mechanical fasteners that are required to secure the parts or structural pieces together.

In accordance with modular satellite assembly techniques, the major structural components are assembled from composite parts and bolted together, including a series of access panels. In order to reduce weight, composites are used for the spacecraft. Although such state of the art spacecraft designs have made great strides in reducing part count and weight, the use of composites in these spacecraft designs still relies heavily on geometry and joint methods from traditional metal fabrication and assembly techniques. Areas of improvement include using the composites in a way to maximize the benefits composites offer over conventional fabrication materials in order to further reduce total part count.

Studies have shown that the number of parts is directly proportional to assembly cost increases. For each part, there must be a designer, a checker, a planner and planning paper, an expeditor or subcontract manager and more paper, etc. In addition, more parts in an assembly complicates the assembly process, which results in more assembly tooling and assembly time. Reducing part count is critical to reducing assembly costs.

On the other hand, if part reduction goes to the extreme and results in only a few parts that are extremely complex, the end result can be high part scrap and rework rate, and long fabrication times, thus negating the cost saving of minimizing part count. One of the design goals of the present invention is to strike a balance between minimum part count and part complexity.

It is well understood that the efficiency of composites is decreased as the number of fasteners and discontinuous joints are increased in the completed structure. To obtain the maximum benefits of composites, spacecraft designers must rethink the way they fabricate and assemble the major structural components of spacecraft. A continuous primary structure having a minimum number of bolt together fasteners would be a more efficient use of composites. Of course, a continuous composite containment structure for satellite primary structure fabrication is of little benefit if it does not permit good access to the spacecraft interior for installation and testing of the spacecraft subsystems prior to launch.

Figure 1:
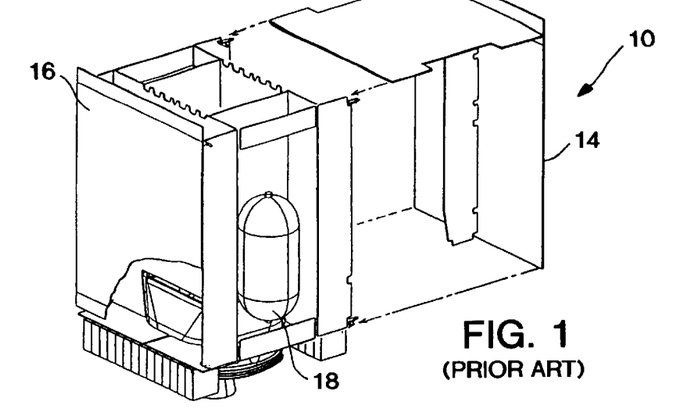
FIG. 1 is a perspective view of a typical prior art modular spacecraft with integral propulsion system.

An example of a typical prior art modular spacecraft using a high degree of composites is designated generally by reference numeral 10 in FIG. 1. This configuration, which includes a payload module 14 and core module 16 with integral propulsion subsystem 18, is specifically designed as a geosynchronous communications satellite and is optimized for high altitude staring payloads. The typical prior art modular spacecraft 10 is characterized by a relatively high part count, low stiffness, and relatively low thermal and dimensional stability and therefore is not suitable for low altitude missions, such as remote sensing missions, that use agile pointing payloads.

Inadequate or limited access to the spacecraft interior is also a problem associated with most state of the art modular spacecraft. A case in point is the procedure that is required for installing the integral propulsion subsystem 18 in the typical prior art modular spacecraft 10. In view of the limited access to the spacecraft interior, and further in view of the presence of other pre-installed subsystems, the propulsion subsystem 18 must be installed as a number of subassemblies, each of size small enough to fit within the access panel openings. Once the propulsion system subassemblies are inside the access panels, they must be maneuvered around the other pre-installed subsystems into their assigned locations. The various subassemblies of the propulsion subsystem are then welded together in place. Field welding of this nature is both costly and time intensive since it must be done in a clean room environment and it further requires use of special portable welding apparatus so as not to compromise the other subsystems of the spacecraft.

Much greater manufacturing and assembling efficiencies could be realized if the propulsion subsystem could be installed within the spacecraft as a fully assembled plug and play unit. Accordingly, a modular spacecraft design having reduced part count and number of fasteners and a structural geometry that enables full and unimpeded access to the various subsystems of the spacecraft during assembly, installation and testing would constitute a significant advancement.

The typical prior art spacecraft 10 also does not package well in that it does not allow for growth by adding additional subsystem components such as electronics boxes, reaction wheels, etc, without further compromising the structural stiffness and stability of the spacecraft. As noted above, a number of the spacecraft subsystems, such as the propulsion subsystem, must be installed as a number of subassemblies. This design does not permit easy and convenient subsystem removal for repair, replacement and/or upgrade.

Thus, it would be desirable to provide a modular spacecraft structure in which the various subsystems are segregated into separate modules to permit parallel production and testing. A further improvement in the manufacture of spacecraft would be the provision of a standard bus that can also be fabricated in advance and in an efficient time frame. Further still, there is a need for a modular spacecraft bus that is easily produced and is easily adaptable and scalable to a wide range of satellite missions.

SUMMARY OF THE INVENTION

It is among the objects of the present invention to provide a medium class satellite bus of modular design which maximizes multi-mission adaptability and structural performance while at same time minimizing cost.

It is a related object of the present invention to provide a satellite bus including a bus module that is able to accommodate multiple launch vehicle requirements including launch loads and fairing volumes.

It is a related object of the invention that the bus module exhibits high stiffness, high thermal stability, and a high strength-to-weight ratio.

It is another object of the invention that the bus module maximize mission versatility through provision of removable side panels having standardized mounting hardware adapted to receive a variety of standardized subsystems components, including attitude reference components, communications components, and radiators.

It is another object of the present invention to provide a module satellite bus design that strikes a balance between minimum part count and part complexity.

In accordance with a preferred embodiment of the invention, the modular bus structure is composed of several scalable modules, including a propulsion module and one or more stackable space modules, each using standard subsystems or components with common structures and/or interfaces, that can be processed in parallel to minimize nonrecurring and recurring costs. Each stackable space module includes a generally cylindrical central hub having a plurality of radial rib panels extending outwardly therefrom to form a plurality of bays for containing subsystem equipment. The hub includes a hollow center sized to receive the propulsion module as a fully assembled unit. The radial rib panels carry the primary structural load of the spacecraft. Also provided are removable side access panels that form enclosures for the bays. The side access panels include equipment mounts along an inside surface for mounting the subsystem components and radiators along an outside surface to provide thermal cooling for the mounted subsystem equipment. The modular bus structure of the present invention is lightweight, stiff, strong, dimensionally stable and is therefore most suitable for highly agile, remote sensing commercial, civil space and government missions.

The high degree of access to the spacecraft interior afforded by the present invention allows the various subsystems to be installed as separate, line tested assemblies. The present invention significantly reduces recurring costs and launch costs due to shorter production, test, and launch campaign schedules.

An advantageous feature of the modular bus structure is the capability for 'escalating scaleability' in which the bus structure can be increasingly tailored to meet specific mission requirements, from simply adding or replacing electronic cards for the subsystem equipment contained in one or more bays of a space module to adding an additional space module to the stack. The modular bus structure can also be sized to launch for a variety of medium to heavy lift launch vehicles.

Another advantageous feature of the present invention is that the capability to accommodate multiple payload mounting configurations including three point statically determinant mounts.

DETAILED DESCRIPTION OF THE PREFERRED EMBODIMENTS

Figure 2:
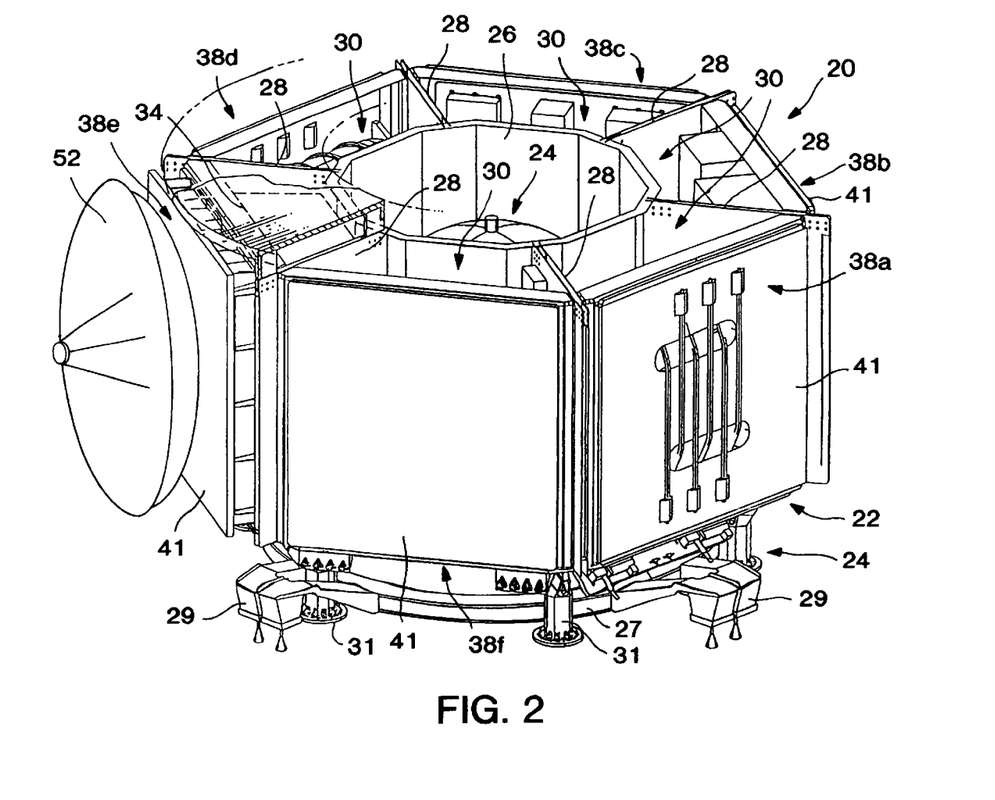
FIG. 2 is a perspective view of the modular satellite bus structure of the present invention which includes a mission configurable space module together with a propulsion module.
Figure 3:
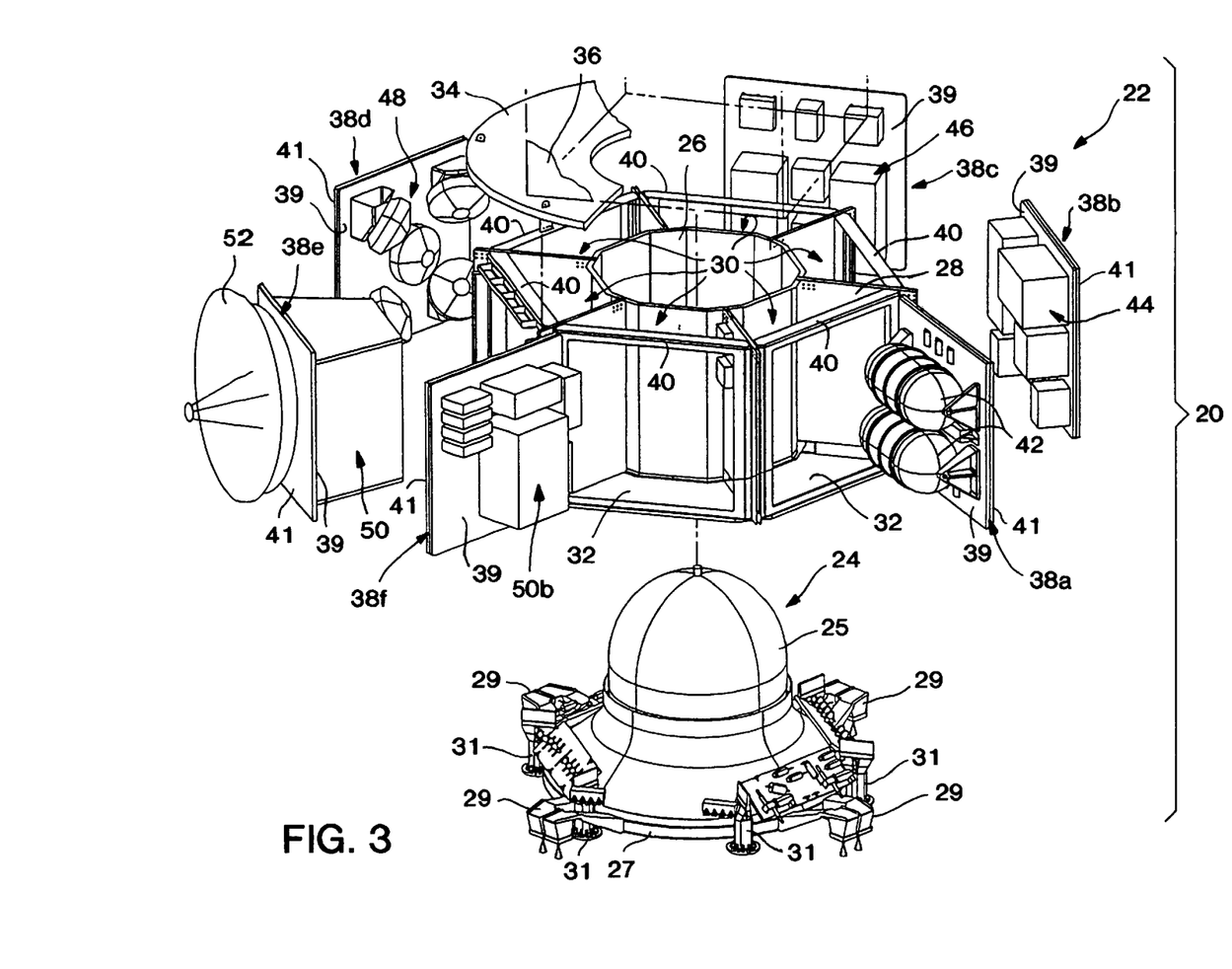
FIG. 3 is a partially exploded perspective view of the modular satellite bus structure of FIG. 1 showing the propulsion module separated from the mission configurable space module.

Referring now to FIGS. 2 and 3, there is shown a modular spacecraft bus structure 20 according to the present invention. The bus 20, as shown, includes a mission configurable space module 22 and a propulsion module 24.

The space module 22 is designed as a stackable structure that is both dimensionally stiff and thermally stable. The space module includes a central core portion in the form of a generally cylindrical hub 26. A plurality of radial rib panels 28 extend at spaced intervals about an outer periphery of the hub 26 and form a number of bays 30 for housing the subsystem equipment or components. Base panel 32 is provided for enclosing a lower portion of each bay 30 and is adapted as a booster bulkhead. Top panel 34 is provided for enclosing an upper portion of each bay 30 and is adapted to interface with payload 36 (a portion of which is shown in FIG. 3). The top panel 34 serves as a mission module payload interface. The space module 22 can mount anywhere that is supported by the radial rib panels 28 from 48" to 106" diameter and in 3 point, 4 point, 6 point, or cylindrical mounting configurations. The proposed mounting structure satisfies the current requirements of a wide range of emerging commercial, civil space and government programs.

The space module 22 further includes a plurality of removable side access panels 38a–f which attach to outer portions of radial rib panels 28 to enclose the bays 30. In the embodiment shown, each of the side access panels 38a–f are removably attached to a frame or bezel 40 that, in turn, is fixedly connected between an adjacent pair of the radial rib panels 28. In other embodiments, the bezel 40 may be omitted such that the removable access panels 38 detachably attach directly to the end portions of the radial rib panels 28.

The propulsion module 24 includes a tank portion 25 supported on a mounting ring 27. A plurality of thrusters 29 extend from the mounting ring 27. The mounting ring 27 also includes booster adapter interface structure 31.

In the preferred embodiment, the side access panels 38a–f provide dual function as both an equipment mount and a radiator panel. As best seen in FIG. 3, the interior surface of each side access panel 38a–f includes appropriate mounting hardware for receiving various subsystem equipment or components. Since the batteries and various subsystem electronics are distributed on the outer most panels of the module 22, just about all the heat generated within the module is concentrated along the side access panels 38a–f. Thus, the incorporation of radiators 41 on the exterior surfaces of the side access panels 38a–f provides a simple and low cost solution for removing heat from inside the module 22 without resort to additional and complex thermal control systems which otherwise increase weight and take up useable volume inside the module. Heat pipes and the like, may be integrated into some or all of the walls of the composite panel structure for optimized thermal control of the subsystem electronics and batteries.

In accordance with a preferred embodiment, the electronics of the various subsystems are placed on individual standardized card interfaces that plug into slots on one or more common back planes 39 mounted directly to the interior broad flat surface of one or more of the removable side access panels 38a–f. A series of standardized card interfaces are assigned for the guidance, navigation, control, command, propulsion, communications, and thermal subsystems.

For purposes of the following description, the side access panels 38a–f are named in correspondence to the subsystem equipment or components they carry. For example, battery modules 42 are carried by the battery panel 38a. The electrical power subsystem (EPS) 44 is carried by the EPS panel 38b. The electronics for Command & Data Handling subsystem (CDH) 46 are carried by CDH panel 38c. Station keeping subsystems like reaction wheel assemblies (RWA) 48 are carried by the RWA panel 38d. While not shown, other types of station keeping components could also be included and supported on a dedicated removable side access panel including, but not limited to, momentum wheels and control moment gyroscopes (CMGs). The communication electronics 50a and dish antennae 52 are carried by the comm panel 38e. Additional communications electronics and/or other miscellaneous equipment 50b are carried by the comm panel 38f. The comm panel(s) may be fitted with antennae of fixed or gimbaled configuration and may include existing X-Band gimbaled antennae, K-band fixed or gimbaled antennae, or may employ a communications system of custom configuration. While not shown, solar array cells may be mounted on separate equipment panels which may be of either fixed or deployable configuration.

The materials of construction for the various panels (top, bottom, radial rib, and side panels) preferably include use of high modulus and near zero CTE (coefficient of thermal expansion) and CME (coefficient of moisture expansion) composite materials. Load bearing panels are preferably formed from top and bottom graphite epoxy sheets 110 and 112 which enclose an aluminum honeycomb core. Heat pipes may be integrated into the honeycomb core at optimized locations to provide thermal cooling for the electronics and battery modules. Similar heat pipe structure may be integrated into other panel walls of the module as desired to provide thermal regulation for the enclosed subsystems. Face sheet material for the exterior or radiator side of the side access panels 38a–f can be tailored to meet mission specific thermal or radiation protection requirements.

The flat dual-function equipment mount/radiator panel design is optimized for mission adaptability. The removable side panel design allows for simple changeout of entire subsystems. For example, a battery panel mounted with 80 Ah batteries may be replaced by another battery panel with 120 Ah batteries pre-installed thereon. Side panel face sheet material can be tailored to meet mission specific thermal or radiation protection requirements.

In the preferred embodiment shown in FIG. 2–3, the space module 22 is of hexagonal configuration. The hexagonal configuration (both external and internal) is optimal for efficiently packaging bus components, such as control moment gyros (CMGs) or reaction wheels, monoprop or biprop fuel, fixed or deployable solar arrays, etc.

The high degree of access to the spacecraft interior afforded by this design allows the propulsion module 24 to be received within the hub 26 as a complete assembly. Thus, no welding is required during final assembly or check out. In this way, the propulsion systems could be made as a Line Replaceable Unit (LRU). This reduces costs for final assembly and increases the flexibility during final checkouts, fueling, and pressurization operations. No expensive field welding operations are needed with the present invention. This significantly reduces recurring costs and launch costs due to shorter production, test, and launch campaign schedules.

Figure 4:
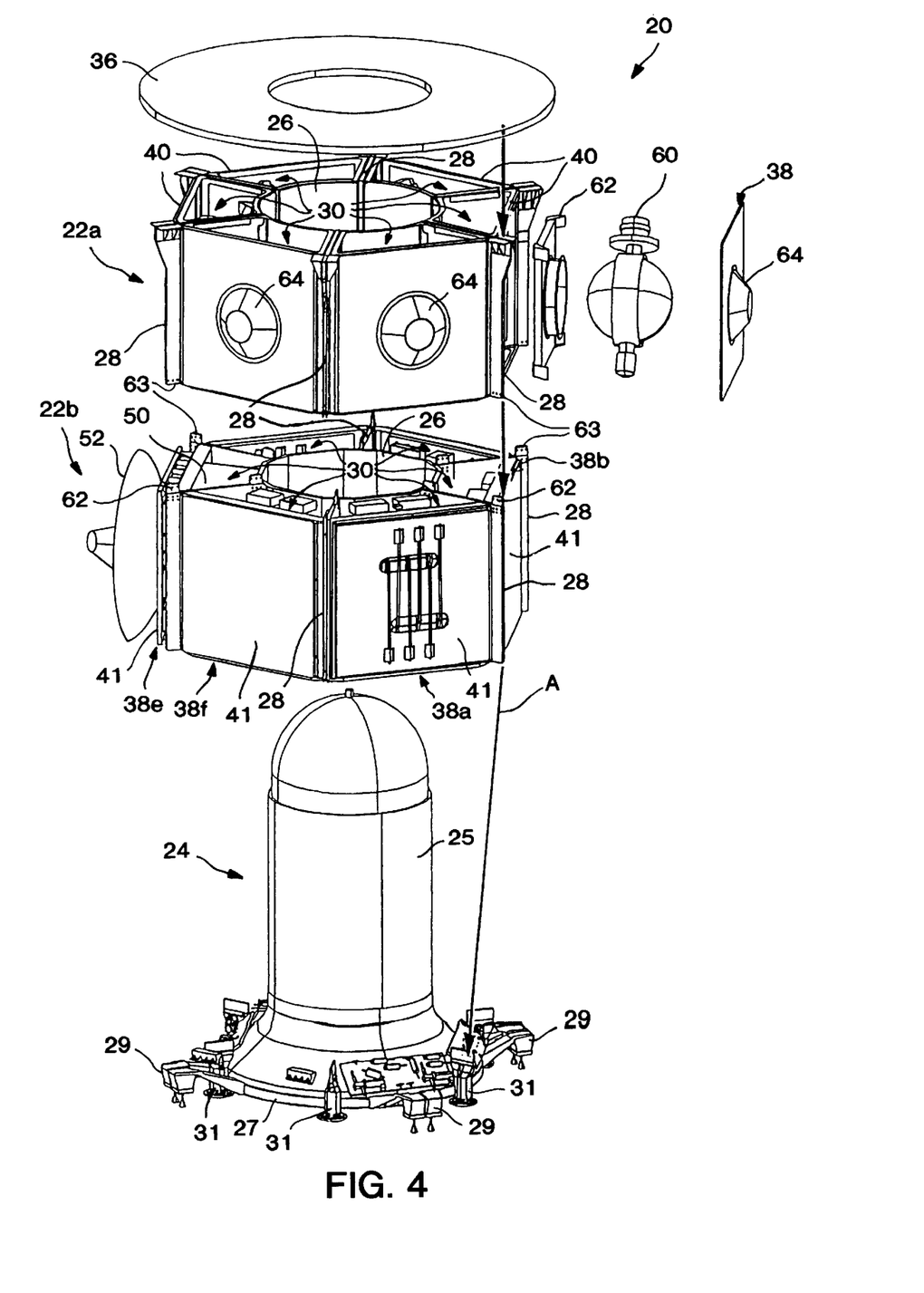
FIG. 4 is a partially exploded view of another embodiment of the invention which shows two mission configurable space modules in stacked configuration together with a propulsion module.

FIG. 4 illustrates a two stack embodiment consisting of upper module 22a, lower module 22b and propulsion module 24. In this embodiment, the upper module 22a is designated as a control module as it is configured to contain a control moment gyro (CMG) 60 in each bay 30. The bays 30 include additional support structure 62 for supporting the CMGs 60 within the bays 30. Each of the side access panels 38 are formed with outwardly bulged regions 64 to conform to the enclosed CMG 60. The lower module 22b is designated as an electronics module as it contains the electronics for the various subsystems.

The present invention provides a direct and efficient primary load path from payload to booster adapter along the radial rib panels 28. Most secondary loads attach directly to the radial rib panels 28. The primary load path, designated by reference arrow A, travels through the radial rib panels 28 to the booster adapter interface structure 31 on the mounting ring 27 of the propulsion module 24.

The modules 22a, 22b are easily stacked, one on top of the other, to scale the bus to mission specific requirements. The stacked modules 22a, 22b are mechanically joined along the primary load path by splice plate connectors 63, with splice plate connectors made of Titanium being preferred. This arrangement ensures multiple mission load path integrity.

Figure 5:
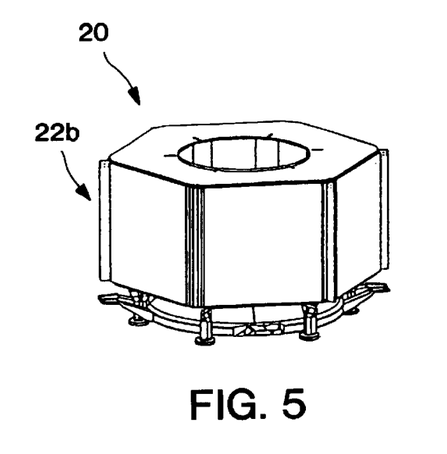
FIG. 5 is a perspective view of a fully assembled single stack space module embodiment of the present invention.
Figure 6:
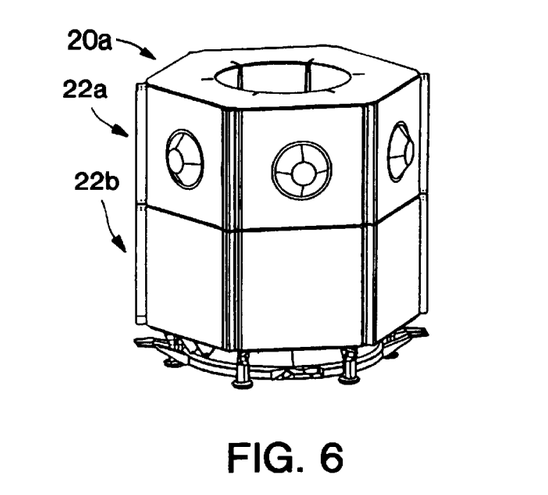
FIG. 6 is a perspective view of a fully assembled double stack space module embodiment of the present invention.
Figure 7:
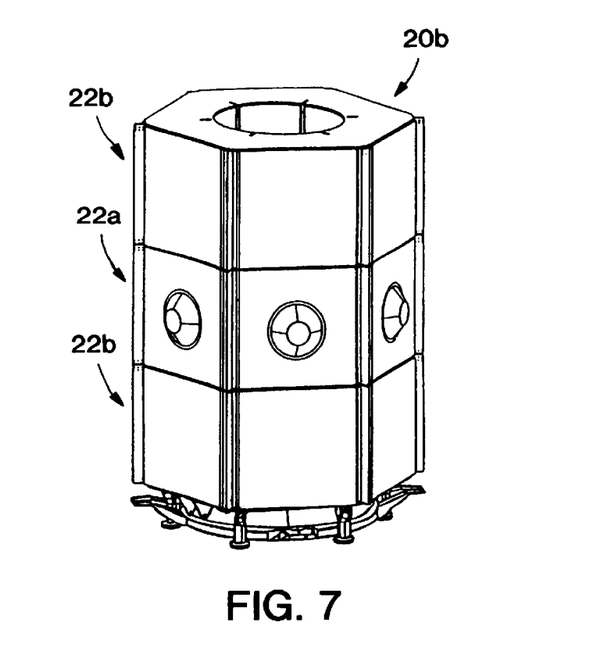
FIG. 7 is a perspective view of a fully assembled triple stack space module embodiment of the present invention.

The multi-mission adaptability of the present invention is further illustrated in the series of FIGS. 5 through 7. In FIG.

5, a modular spacecraft bus 20 consisting of a single electronics module 22b for smaller vehicles is shown. FIG. 6 shows a modular spacecraft bus 20a having a double stacked arrangement consisting of a control module 22a atop an electronics module 22b (see also FIG. 4). FIG. 7 shows a modular spacecraft bus 20b having a triple stack arrangement consisting of a control module 22a between two electronics modules 22b. Various other of stack configurations are possible including, for example, a stack of multiple single module spacecraft in a single payload fairing for multiple launch applications.

Figure 8:
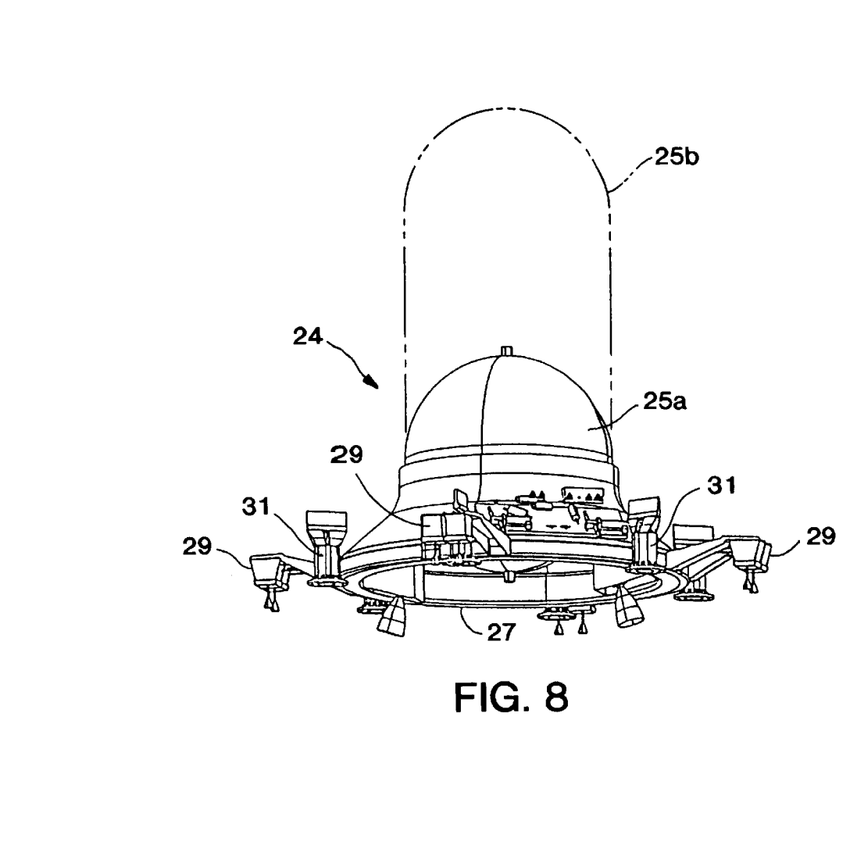
FIG. 8 is a view of the propulsion module which illustrates scaleability of the propulsion module to meet mission requirements.
Figure 9:
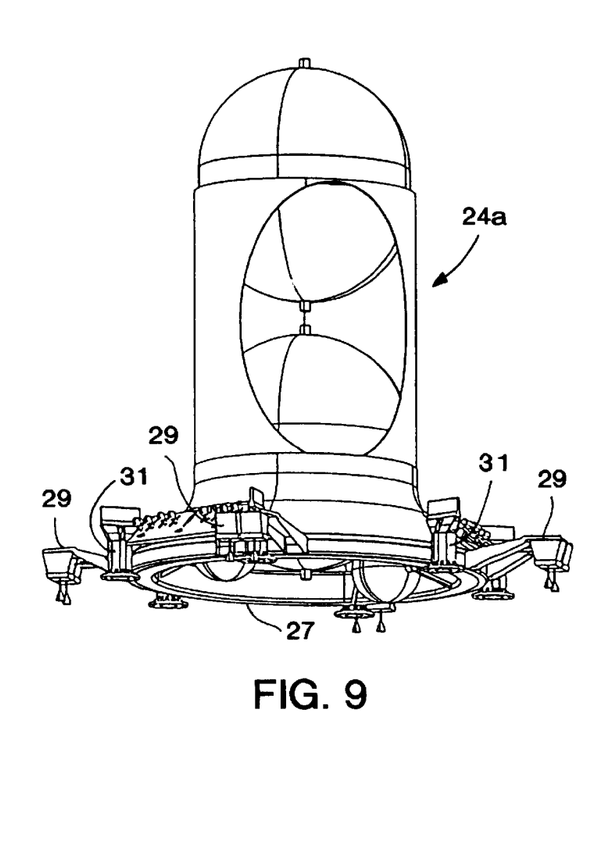
FIG. 9 is a view of an alternate embodiment of the propulsion module of the present invention.

The various subsystems and components of the present inventions are also scalable to provide maximum tailorability for mission specific requirements. For example, with reference to FIG. 8, the propellant system 24 may be configured with a small tank 25a suitable for the single electronics module spacecraft embodiment of FIG. 5. Alternatively, the propellant system 24 may be configured with a larger tank 25b (of a diameter common to that of the small tank 25a) suitable for the double or triple stack module embodiments of FIGS. 6 and 7. Both large and small tank embodiments utilize the same propellant management device and are mountable to a common mounting ring 27 with thruster mounts 29 and launch vehicle interface 31. FIG. 9 illustrates another variation as a biprop propulsion module 24a. Each propulsion module is a fully assembled and pressure tested system before installation on the spacecraft.

Figure 10:
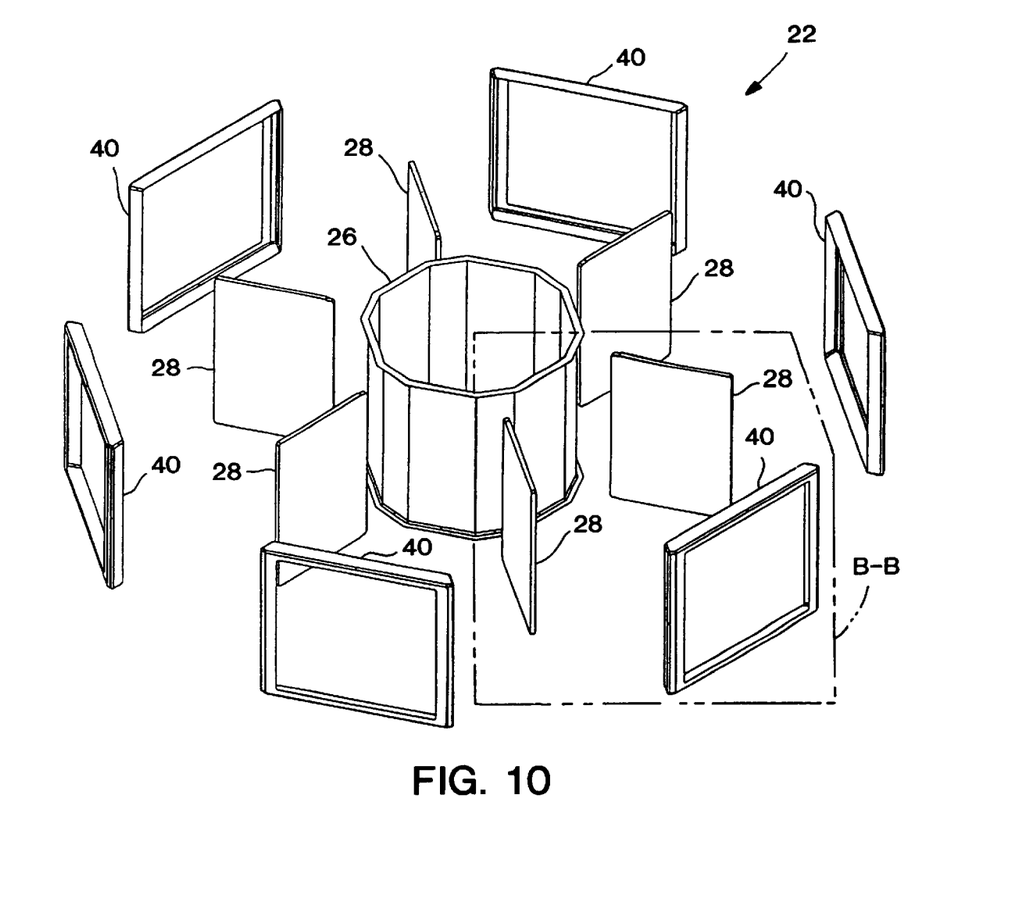
FIG. 10 is an exploded perspective view illustrating one example embodiment of the stackable mission configurable space module structure of the present invention.
Figure 11:
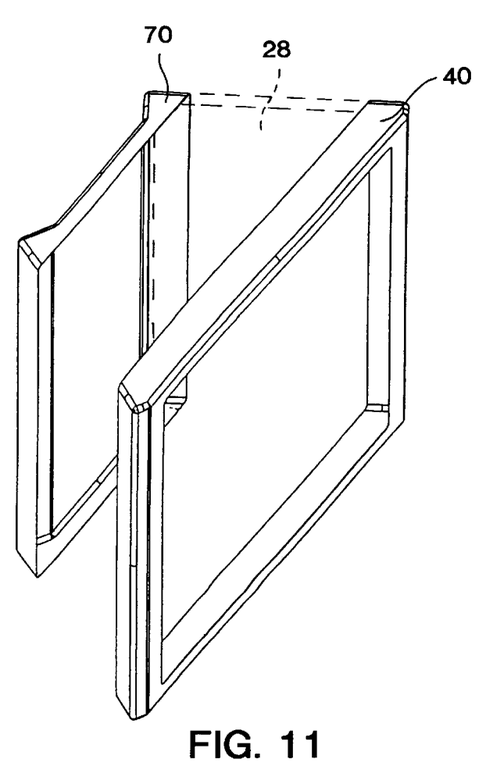
FIG. 11 is a perspective view showing the inner and outer bezels used to form a section of the stackable mission configurable space module structure in accordance with one embodiment of the invention.
Figure 12:
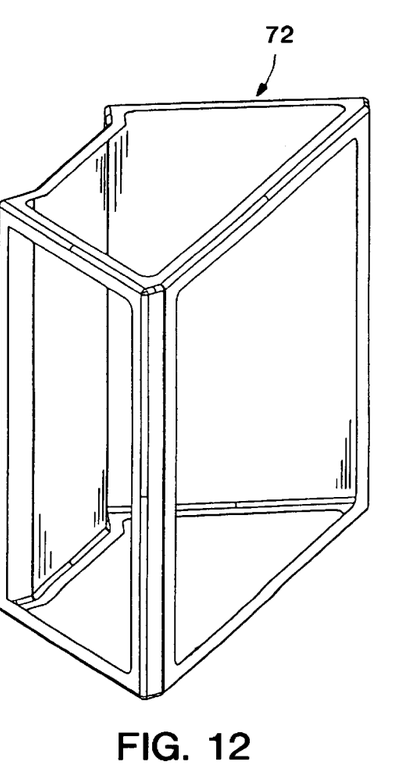
FIG. 12 is a perspective view showing a section of the stackable mission configurable space module structure formed as a single piece composite lay up in accordance with another embodiment of the invention.

FIGS. 10–12 illustrate potential modular bus design solutions that strike a balance between minimum part count and part complexity. Each bus module 22, 22a, 22b, etc contains a maximum of 48 parts, with a potential of reducing that number to as little as 13 or less. As a comparison, a typical prior art modular spacecraft approach to this bus structure would result in a design with 384 parts. Part complexity ranges from flat panels and simple 60° and 120° continuous angles for the 48 part design, to flat panels and 5" high 3D "bezel" composite layups for the 13 part design.

FIG. 10 is an exploded view of the module 22 as described above and which shows the layout of the hub 26, radial rib panels 28, and bezels 40. All these parts may be held together using mechanical fasteners and/or adhesives. Not shown are the removable side access panels that mount to the bezels 40 and the top and base panels.

Proposed design alternatives for the region of the module enclosed by the dashed line B—B are shown in FIGS. 11 and 12. FIG. 11 shows a 13 part design wherein the radial rib panels 28 are secured between outer bezel 40 and inner bezel 70. The bezels 40 and 70 are each fabricated as a layup of composite material. Inner bezel 70 forms a portion of the hub 26. The inner bezels 70 may either be fastened together in adjoining fashion or may linked together by interposed panels or 'leaves' depending on the number of bays and bay volume needed to meet specific mission requirements.

FIG. 12 shows an example of a sub 13 part design wherein a section 72 of the module 22 is formed as a single composite layup. This section 72 integrates the outer bezel, a pair of radial rib panels, and a portion of the hub. By reducing the primary structure of the spacecraft to a minimum number of continuous polyhedronal shaped composite pieces, a significant reduction in the spacecraft part count is realized. Also, higher weight reductions are achieved through higher use of continuous load paths. The reduction in the number of mechanical joints and fasteners that are needed will achieve a lower amount of touch labor, thus reducing the cost of the spacecraft.

Figure 13:
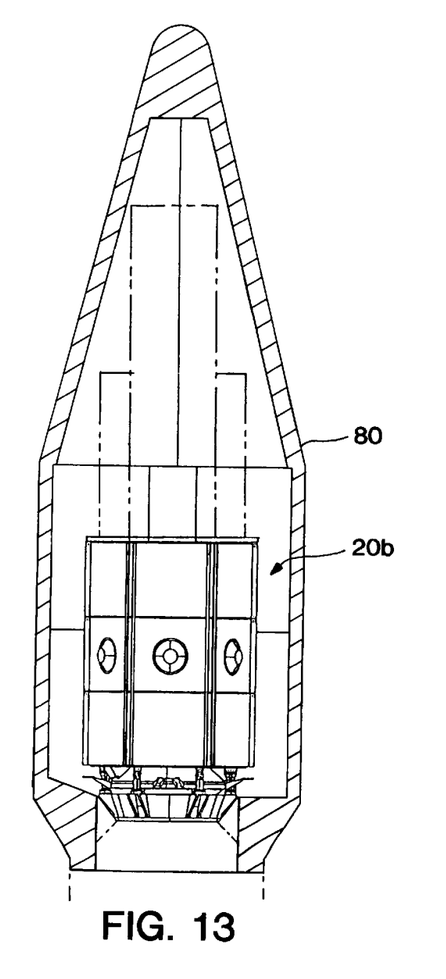
FIG. 13 is a cut away cross-sectional view of a payload fairing containing a multi-stack space module embodiment of the present invention.

FIG. 13 illustrates the triple stack modular spacecraft bus 20b of FIG. 7 located within a space launch vehicle 80. The modular spacecraft bus 20b may have an array of deployable panels (not shown) located around it within the launch vehicle 80.

Figure 14:
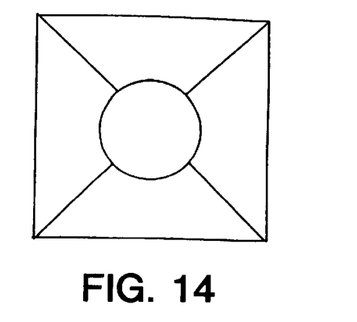
FIGS. 14 through 17 are a series of top plan views illustrating examples of different possible geometric configurations for the stackable mission configurable space module of the present invention.
Figure 15:
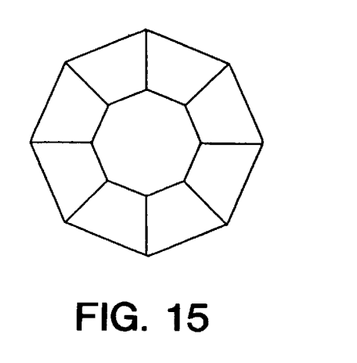
Figure 16:
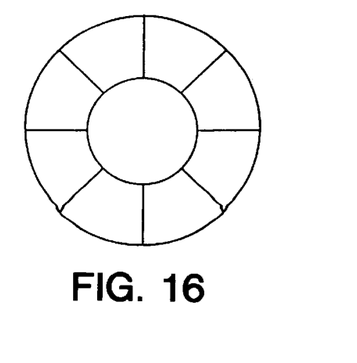
Figure 17:
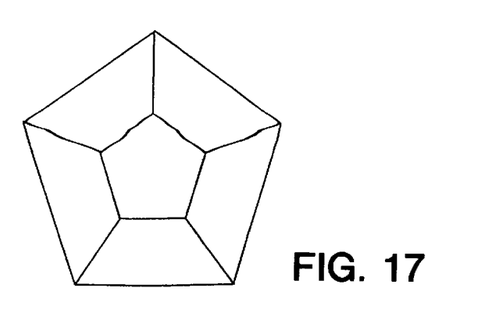

While the foregoing describes the modular spacecraft bus of the present invention as having a hexagonal configuration, it is understood that other geometric configuration are possible without departing from the spirit of the present invention. FIGS. 14 through 17 show, by way of example and not by way of limitation, some alternate geometric configurations contemplated by the present invention. A square modular bus configuration is shown in FIG. 14. An octagonal modular bus configuration is shown in FIG. 15. A cylindrical configuration having eight bays is shown in FIG. 16 and a pentagonal bus configuration is shown in FIG. 17.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A space module for a mission configurable and scalable spacecraft bus said space module having a stackable configuration which adapts both to a payload at one end of the space module and to a mounting ring of a propulsion module at the other end of the space module, said space module comprising:

a) a central hub portion of generally cylindrical shape having an outer periphery and having a hollow interior portion sized to receive a propulsion tank of a propulsion module centrally and longitudinally within the hollow interior portion;

b) a plurality of spaced apart radial rib panels extending from said outer periphery of said central hub portion and defining a plurality of bays between the rib panels and the central hub portion and sized for containing subsystem components, said radial ribs panels being constructed to provide a primary structural load pathway through the space module from the mounting ring of a propulsion module to a payload;

c) a base panel enclosing a lower portion of each of said bays and constructed to provide a bulkhead for connection to the mounting ring of a propulsion module, d) a top panel enclosing an upper portion of each of said bays and constructed to provide an interface with a payload; and e) a plurality of removable exposed side panels for enclosing said bays, and wherein each side panel includes an interior wall portion adapted to mount subsystem components thereon and an exposed exterior wall portion defining a radiator to remote heat generated by said subsystem components.

2. The space module for a mission configurable and scalable spacecraft bus module according to claim 1, wherein:

a) adjacent pairs of said radial rib panels include a bezel spanning therebetween; and b) each bezel for receiving a respective one of said removable side panels.

3. The space module for a mission configurable and scalable spacecraft bus module according to claim 1, wherein said radial rib panels include coupling devices for coupling respective radial rib panels of a stack of mission configurable space craft modules.

4. The space module for a mission configurable and scalable spacecraft bus module according to claim 3, wherein each of said coupling devices include a splice plate connector.

5. The space module for a mission configurable and scalable spacecraft bus module according to claim 1, wherein said subsystem components mountable to said side panels comprise battery modules, electronics for housekeeping functions including power generation, command and data handling, thermal control, and communications, station keeping components, including control moment gyros and reaction wheels.

6. The space module for a mission configurable and scalable spacecraft bus module according to claim 1, wherein said hub, said radial rib panels and said removable side panels are fabricated from composite materials.

7. A mission configurable spacecraft bus module having a stackable configuration and which adapts to a payload and a booster, said module comprising:
 a) a central hub portion of generally cylindrical shape having an outer periphery and a hollow interior portion sized to receive a propulsion tank;
 b) a plurality of spaced apart radial rib panels extending from said outer periphery of said central hub portion thereby defining a plurality of bays sized for containing subsystem components, said radial ribs panels provide a primary structural load pathway from payload to booster;
 c) a base panel enclosing a lower portion of each of said bays and adapting to said booster;
 d) a top panel enclosing an upper portion of each of said bays and adapting to said payload; and
 e) a plurality of removable exposed side panels for enclosing said bays, and wherein each side panel includes an interior wall portion adapted to mount subsystem components thereon and an exposed exterior wall portion defining a radiator to remote heat generated by said subsystem components; and wherein
 f) adjacent pairs of said radial rib panels include a bezel spanning there between;
 g) each bezel for receiving a respective one of said removable side panels; and
  wherein each of said adjacent pairs of radial rib panels, said bezel, and a portion of said hub spanning each of said adjacent pairs of radial rib panels is formed as a single composite lay up.

8. A mission configurable and scalable modular spacecraft bus, comprising:
 a) a propulsion module including a mounting ring, a propulsion tank supported on the mounting ring and extending upwardly and centrally from the mounting ring, said propulsion tank having a longitudinal length which can be configured to provide the propellant volume required for a specific mission requirement, a launch vehicle interface supported on the mounting ring and having booster adapter interface structure for connecting the mounting ring to a launch vehicle a plurality of thrusters connected to and extending from the mounting ring, all fully assembled and pressure tested prior to installation within the spacecraft;
 b) a first space module having a stackable configuration and which adapts to both a payload at one end of the first space module and to said mounting ring of said propulsion module at the other end of the first space module, said first space module comprising:
  i) a central hub portion of generally cylindrical shape having an outer periphery and having a hollow interior portion sized to receive said propulsion tank of said propulsion module within the hollow interior portion;
  ii) a plurality of spaced apart radial rib panels extending from said outer periphery of said central hub portion and defining a plurality of bays between the rib panels and the central hub portion and sized for containing subsystem components, said radial ribs panels being constructed to provide a primary structural load pathway through the first space module from said mounting ring to a payload;
  iii) a base panel enclosing a lower portion of each of said bays and constructed to provide a bulkhead for connection to said mounting ring;
  iv) a top panel enclosing an upper portion of each of said bays and constructed to provide an interface with a payload; and
  v) a plurality of removable exposed side panels for enclosing said bays, and wherein each side panel includes an interior wall portion adapted to mount subsystem components thereon and an exposed exterior wall portion defining a radiator to remote heat generated by said subsystem components.

9. The mission configurable and scalable modular spacecraft bus according to claim 8, wherein:
 a) adjacent pairs of said radial rib panels include a bezel spanning therebetween; and
 b) each bezel for receiving a respective one of said removable side panels.

10. The mission configurable and scalable modular spacecraft bus according to claim 8, wherein said radial rib panels include coupling devices for coupling respective radial rib panels of a stack of mission configurable space craft modules.

11. The mission configurable and scalable modular spacecraft bus according to claim 10, wherein each of said coupling devices include a splice plate connector.

12. The mission configurable and scalable modular spacecraft bus according to claim 8, wherein said subsystem components mountable to said side panels comprise battery modules, electronics for housekeeping functions including power generation, command and data handling, thermal control, and communications, station keeping components, including control moment gyros and reaction wheels.

13. The mission configurable and scalable modular spacecraft bus according to claim 8, wherein said hub, said radial rib panels and said removable side panels are fabricated from composite materials.

14. A mission configurable modular spacecraft bus, comprising:
 a propulsion module including a propulsion tank, thruster mounts, mounting ring, and launch vehicle interface, all fully assembled and pressure tested prior to installation within the spacecraft;
 a space module having a stackable configuration and which adapts to a payload and a booster, said module comprising:
  a central hub portion of generally cylindrical shape having an outer periphery and a hollow interior portion sized to receive said propulsion tank of said propulsion module;
  a plurality of spaced apart radial rib panels extending from said outer periphery of said central hub portion thereby defining a plurality of bays sized for containing subsystem components, said radial ribs panels provide a primary structural load pathway from payload to booster;

a base panel enclosing a lower portion of each of said bays and adapting to said booster;

a top panel enclosing an upper portion of each of said bays and adapting to said payload; and a plurality of removable exposed side panels for enclosing said bays, and wherein each side panel includes an interior wall portion adapted to mount subsystem components thereon and an exposed exterior wall portion defining a radiator to remote heat generated by said subsystem components and wherein adjacent pairs of said radial rib panels include a bezel spanning therebetween; and each bezel for receiving a respective one of said removable side panels; and wherein each of said adjacent pairs of radial rib panels, said bezel, and a portion of said hub spanning each of said adjacent pairs of radial rib panels is formed as a single composite lay up.

15. The mission configurable and scalable modular spacecraft bus defined in claim 10 including at least one additional space module coupled to said first space module and wherein said additional space module comprises:

a central hub portion of generally cylindrical shape having an outer periphery aligned with the outer periphery of said first space module and having a hollow interior portion aligned with the hollow interior portion of said first space module and sized to receive said propulsion tank of said propulsion module within the hollow interior of the central hub portion of the additional space module;

a plurality of spaced apart radial ribs extending from said outer periphery of said central hub portion and aligned with said radial rib panels of said first space module and defining a plurality of bays between the rib panels and the central hub portion of the additional space module and sized for containing subsystem components, said radial ribs of the additional space module being constructed to provide a primary structural load pathway through the additional space module from the aligned radial ribs of the first space module to a payload associated with the additional space module;

a base panel enclosing a lower portion of each of said bays of the additional space module and constructed to provide a bulkhead for connection to said top panel of said first space module;

a top panel enclosing an upper portion of each of said bays of the additional space module and constructed to provide an interface with a payload; and a plurality of removable exposed side panels for enclosing said bays of the additional space module, and wherein each side panels includes an interior wall portion adapted to mount subsystem components thereon and an exposed exterior wall portion defining a radiator to remove heat generated by said subsystem components; and wherein said propulsion tank of the propulsion module is configured so as to extend sufficiently for longitudinally within the hollow interior portions of said first and additional space modules to provide the propellant volume required for a specific mission requirement.

* * * * *